March 21, 1961 A. BLAIN 2,976,510
WRENCH FOR PRINTED CIRCUIT CARD LIBRARY RACK
Filed May 2, 1957
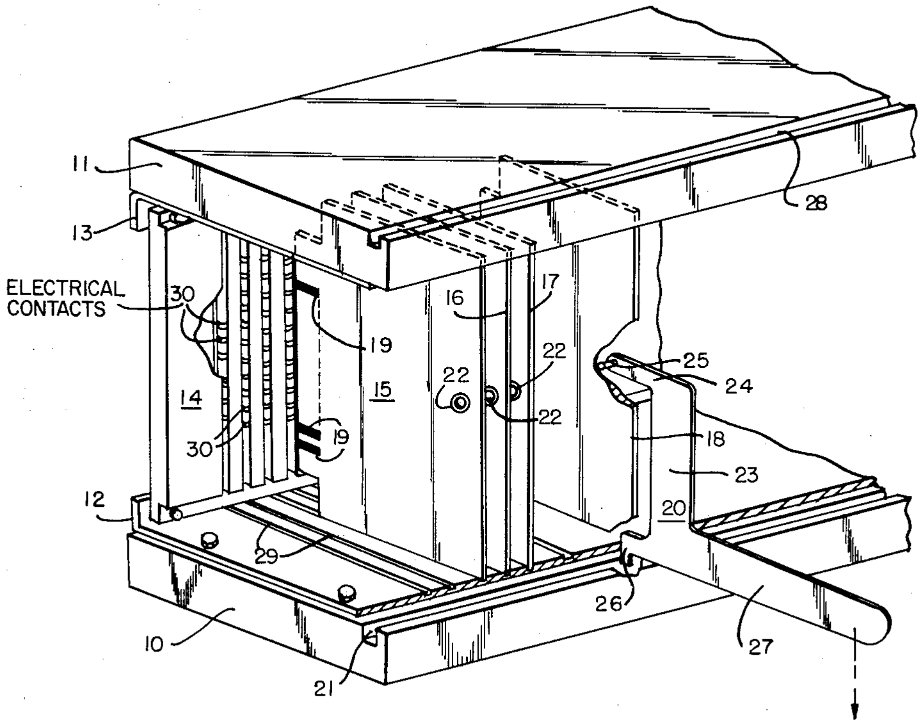
INVENTOR.
Albert Blain
BY
Charles C. English
AGENT 2,976,510

WRENCH FOR PRINTED CIRCUIT CARD LIBRARY RACK

Albert Blain, Philadelphia, Pa., assignor to Sperry Rand Corporation, New York, N.Y., a corporation of Delaware Filed May 2, 1957, Ser. No. 656,538

10 Claims. (Cl. 339—17)

The present invention relates to electrical devices employing printed circuit cards; and is more particularly concerned with a novel structure for selectively placing or displacing such a printed circuit card with respect to a supporting rack.

Many forms of electrical apparatus known at the present time, and in particular electronic computers, employ printed circuit techniques. Such techniques may be practiced, for instance, by preparing cards carrying individual circuits thereon; and by disposing libraries of such cards in a supporting rack which includes terminal connectors. As a matter of practice, when such card library systems are utilized, the cards ordinarily are disposed in substantially parallel relation to one another and closely adjacent one another. When a card is disposed in its proper location it must be pushed into the terminal connector having many contacts. Due to the many contacts required for each card, a force greater than that which can normally be applied with finger pressure is required. Moreover, it is often required to selectively displace an individual card in such a library for selective removal from the rack and for replacement with another card. Because of the relatively close spacing of the cards comprising a library, it has in the past been extremely difficult to manually grip an individual card in a library whereby such selective displacement of a card has been awkward and inconvenient. Furthermore, the force required to displace the card from the terminal connector is greater than that which can normally be applied with a finger grip.

The present invention serves to obviate these known difficulties of card libraries, and provides a novel tool for use with such libraries whereby individual printed circuit cards may be quickly and readily handled in conjunction with a card supporting rack.

It is accordingly an object of the present invention to provide an improved card library structure wherein printed circuits cards may be more readily placed therein, or removed therefrom than has been the case heretofore.

A further object of the present invention resides in the provision of a novel tool in the nature of a wrench for use in displacing cards in a printed circuit card library.

A further object of the present invention resides in the provision of a novel card library adapted to cooperate with an improved actuator device for the selective insertion or removal of printed cards from the library.

Anothr object of the present invention resides in the provision of an improved wrench for use with card libraries, which is rugged in configuration and inexpensive to manufacture.

Still another object of the present invention resides in the provision of a novel method for inserting and/or removing printed circuit cards from a supporting rack.

Another object of the present invention is to provide mechanical means to dispose or remove cards from a printed circuit card library; said means permitting the use of force greater than that which could be applied manually.

Another object of the invention is to provide means, cooperating with a card supporting rack, for disposing or removing cards from a printed circuit library.

In effecting the foregoing objects and advantages, the present invention provides a supporting rack carrying a plurality of printed circuit cards disposed substantially parallel to one another and substantially orthogonal to the said rack. The rack itself preferably includes an elongated groove disposed substantially transverse to the several printed circuit cards comprising a card library. Each of said cards includes an aperture, for instance a hole, located at a position removed from the supporting rack. A novel wrench is also provided, of relatively thin cross-dimension, whereby the said wrench may be readily inserted between adjacent cards comprising a library. The wrench includes an elongated arm which may be inserted in the groove at one of its ends, and which may be attached, for instance by insertion in a card aperture, at the other of its ends. The wrench also includes a handle for selectively pivoting the arm about said one of its ends whereby the motion described by the other end of said elongated arm forcibly removes or inserts a card into the rack. The subsequent description is directed toward a tool of the type described, which is particularly adapted for manual actuation. It will be appreciated, however, that by suitable modifications, the concepts to be described may be utilized in automatic card inserting or removing structures whereby the tool or wrench may take the form of a signal-responsive device.

The foregoing objects, advantages, construction and operation of the present invention will become more readily apparent from a consideration of the accompanying drawing which illustrates a preferred embodiment of the improved card library and wrench therefor. Thus, referring to the drawing, it will be seen that a card library may comprise a rack defined by a pair of spaced supporting members 10 and 11. Members 10 and 11 respectively carry brackets 12 and 13 for supporting between said members 10 and 11 a terminal board 14. In addition, a plurality of printed circuit cards such as 15 through 18 inclusive may be disposed, as shown, between brackets 12 and 13.

In practice, the brackets 12 and 13 define a plurality of grooves such as 29, all of which have not been illustrated for purposes of clarity, and the individual printed circuit cards such as 15 through 18, are inserted into and retained by these grooves 29 in substantially parallel relationship to one another whereby the printed circuits (not shown) on the cards may be electrically connected, through conductive strips 19, to complementary spring-clip terminals which are well known in the art, such as 30, carried by the board 14. The external wires connected to terminals 30 are not illustrated in order to preserve clarity of the drawing. Due to the limited spacing between the several printed circuit cards, it is extremely difficult to manually grip an individual card for insertion into or removal from the library illustrated in the accompanying figure as is often required. In addition, due to the forces exerted by the terminals such as 30, more than finger pressure is normally required for insertion or removal of a card.

In accordance with the present invention, this desired insertion or removal of printed circuit cards from a supporting rack may be accomplished by providing a wrench 20 cooperating with an elongated groove 21 defined in at least one of the supporting members, such as 10; and also cooperating with an aperture or hole such as 22 included in each of the printed circuit cards 15 through 18. The wrench 20 takes the form of a first elongated arm 23 having a second elongated arm 24 attached at one of its ends to one end of the said first arm 23. The other end of the arm 24 carries a projecting pin 25 adapted for selective insertion into one of the apertures 22 carried by a particular printed circuit card to be inserted into or removed from the rack. The wrench 20 further comprises a projecting leg 26 adapted to be inserted in the groove 21 adjacent a card to be removed; and also includes an elongated handle member 27 for selectively causing a pivotal motion of the arms 23 and 24 about the leg 26.

In practice, when it is desired to remove one of the printed circuit cards, such as 18, from the supporting rack, the wrench 20 is inserted between two adjacent cards, one of which comprises the card 18 to be removed. The leg 26 of wrench 20 is inserted into groove 21 while pin 25 is similarly inserted into the hole 22 (not shown) carried by card 18. When downward pressure is thereafter manually applied to the handle 27, the wrench 20 is caused to describe a pivotal motion about its leg 26 and this pivotal motion of wrench 20 causes pin 25 to describe a corresponding rotational motion, thereby to withdraw the card, such as 18, from the spring terminals 30 of connector 14, after which final removal from the rack can easily be performed manually.

In those applications where it is difficult to insert a card into a rack, an analogous but reverse operation utilizing a wrench such as 20 may be effected, in which event the leg 26 may once more be inserted in the groove 21. The pin 25 may then be inserted in a hole 22 of the card to be placed in the rack, and an upward force may thereafter be imposed on the handle 27, thereby to forcibly push the card into the terminals 30 of connector 14.

In known types of card libraries, the rack illustrated in the accompanying figure represents merely one portion of the total library, whereas in practice, a plurality of such racks are stacked one upon the other. When such a library is employed, grooves such as 21 may be defined in each of the supporting members comprising the overall rack, thereby to permit the wrench 20 to be used throughout the rack. Such a further groove associated with supporting member 11, has been designated as 28.

Still further modifications will be suggested to those skilled in the art. In particular, reference is made to the preceding discussion relating to the use of automatic or signal-responsive actuators cooperating with a rack of the type described, for the insertion or removal of cards from the rack. The foregoing description is, therefore, meant to be illustrative only and should not be considered limitative of my invention; and all such possible modifications as are in accord with the principles described are meant to fall within the scope of the appended claims.

Having thus described the invention, what is claimed is:

1. In a card library, a rack comprising first and second supporting members disposed substantially parallel to one another, a plurality of cards disposed in substantially parallel relation to one another between said supporting members, said plurality of cards being disposed substantially orthogonal to said supporting member, at least one of said supporting members including an elongated groove disposed substantially transverse to each of said cards, said cards each including an aperture therein between said first and second supporting members, and a wrench for selectively displacing said cards in said rack comprising an elongated arm removably inserted at one of its ends in said groove adjacent the card to be displaced, and removably connected at the other of its ends in said aperture of the card to be displaced, and a handle for moving said elongated arm about said one of its ends.

2. The structure of claim 1 wherein said elongated arm defines a first projection at said one of its ends for insertion in said groove, said first projection being displaced from a first portion of said arm and being substantially parallel to said first arm portion, a second arm portion having one of its ends at said other end of said first arm portion, said second arm portion being substantially orthogonal to said first arm portion, and a pin projecting from the other end of said second arm portion and substantially orthogonal thereto, said pin being adapted for removable insertion in the said aperture of a card to be displaced.

3. In a printed circuit card library, the combination of a supporting member, a printed circuit card disposed substantially orthogonal to said supporting member, said supporting member having a recess adjacent said card, said card having an aperture spaced from said supporting member, and a wrench for selectively displacing said card with respect to said supporting member, said wrench comprising an elongated arm, said arm having a projection at one of its ends for insertion into said recess so that said wrench may be removably attached to said supporting member, said elongated arm having at the other of its ends a pin adapted to be inserted into said aperture so that said arm may be removably attached to said card, and means for pivotally moving said arm about said one of its ends thereby to displace said card attached to said other end of said arm.

4. In an apparatus comprising a supporting rack for holding a plurality of printed circuit cards, the improvement of said supporting rack including a groove disposed transverse to said cards, and the combination therewith of a wrench for selectively removing said cards from said supporting rack, said wrench comprising a first arm portion, a first projection from one end of said first arm portion for removable insertion into said groove, a second projection from the other end of said first arm portion, said second projection including a pin mounted in orthogonal relationship to said second projection for removable insertion into an aperture in said card, and a second arm portion connected to said first arm portion at said one of its ends, said second arm portion defining a handle for applying force to said wrench to pivot it about said first projection in said groove.

5. For use in electronic computers, means for selectively inserting and removing printed circuit cards from a supporting rack, said means including the combination of a groove in said supporting rack, and a wrench cooperating with said groove, said groove being disposed transverse to said printed circuit cards, said wrench comprising a first portion and a second portion, said first portion including separate projections at its two ends, one of said projections extending in the same direction as said first portion and being adapted for removable insertion into said groove adjacent a card to be selectively moved, the other one of said projections including a pin orthogonally mounted on said first portion for removable insertion into an aperture in said card to be moved, said second portion defining a handle member, said handle member causing pivotal motion of said wrench about said first projection upon application of pressure to said handle.

6. In combination; a printed-circuit-card rack including means for holding a plurality of printed circuit cards in a closely spaced parallel arrangement, means for making electrical contact with said printed circuit cards, and a groove in said rack transversely disposed to said parallel arrangement of circuit cards; and a wrench for removing said cards from said rack, said wrench having a pivot projection for removable insertion into said transverse groove, a handle, and a further projection on said wrench for insertion into the close space between said parallel cards and into apertures in said cards to remove said cards.

7. In combination; a plurality of printed circuit cards having electrical contacts, and apertures therein; a printed-circuit-card rack including means for holding said plurality of printed circuit cards in a closely spaced parallel arrangement, said rack having contact means for making electrical connection with said printed-circuit-card contacts, and a groove in said rack transversely disposed to said parallel arrangement of circuit cards; and a wrench for removing said cards from said rack, said wrench having a pivot projection for removable insertion into said transverse groove, a handle, and a further projection for insertion into the close space between said parallel cards and into said card apertures, said wrench handle and projections being integral.

8. In a card library wherein a plurality of cards are disposed substantially parallel to one another in a supporting structure, said supporting structure comprising a rack including a groove disposed transverse to said plurality of cards, a tool for selectively displacing preselected ones of said cards, said tool comprising a principal portion from which extend a plurality of subordinate members, said principal portion being substantially centrally located relative to said subordinate members, a first subordinate member comprising a projection rigidly attached to one end of said principal portion of said tool, said first subordinate member including a projecting leg adapted to be inserted into said groove adjacent a card to be displaced and adapted to pivotally abut upon said supporting structure, a second subordinate member adapted to be removably connected to one of said cards, said second member comprising a projection rigidly attached to the other end of said principal portion of said tool, and a third subordinate member rigidly attached to said principal portion of said tool at said one end such that manual forces applied to said third member effect a rotational motion of said second member about said first member thereby to displace said one of said cards.

9. In a card library wherein a plurality of cards having an aperture therein are disposed substantially parallel to one another in a supporting structure, a tool for selectively displacing preselected ones of said cards, said tool comprising a principal portion from which extend a plurality of subordinate members, said principal portion being substantially centrally located relative to said subordinate members, a first subordinate member adapted to pivotally abut upon said supporting structure, said first member comprising a projection rigidly attached to one end of said principal portion of said tool, a second subordinate member adapted to be removably connected to one of said cards, said second member comprising a projection rigidly attached to the other end of said principal portion of said tool and including a pin adapted to be removably inserted into said aperture of a card to be displaced, and a third subordinate member rigidly attached to said principal portion of said tool at said one end such that manual forces applied to said third member effect a rotational motion of said second member about said first member thereby to displace said one of said cards.

10. In a printed circuit card library, a rack comprising a pair of spaced substantially parallel supporting members, a plurality of printed circuit cards disposed in substantially orthogonal contiguity with each of said supporting members, at least one of said supporting members containing a groove disposed transversely to such cards, each of said cards having a hole therein, said hole being located in said cards between the points of contiguity of said cards and said supporting members, and an actuator for selectively displacing one of said cards in said rack comprising a first actuator portion adapted to pivotally cooperate with said groove in said one of said supporting members, a second actuator portion adapted to be inserted into said hole in said card, and a third actuator portion for moving said second portion about said first portion so that said one of said cards is thereby displaced by said actuator.

References Cited in the file of this patent

UNITED STATES PATENTS

| | | |
|---|---|---|
| 306,291 | Smyth | Oct. 7, 1884 |
| 792,009 | Downs | June 13, 1905 |
| 1,393,284 | Henry | Oct. 11, 1921 |
| 1,567,025 | Allison | Dec. 29, 1925 |
| 1,574,319 | Vincent | Feb. 23, 1926 |
| 1,587,200 | Sutcliffe | June 1, 1926 |
| 2,352,710 | Hart | July 4, 1944 |
| 2,539,647 | Williams | Jan. 30, 1951 |
| 2,618,183 | Cooke | Nov. 18, 1952 |
| 2,653,006 | Lewis | Sept. 22, 1953 |